April 2, 1940.  F. D. WILSON ET AL  2,195,607
SELF-PROPELLED ROAD MACHINE
Filed Aug. 31, 1936  12 Sheets-Sheet 3
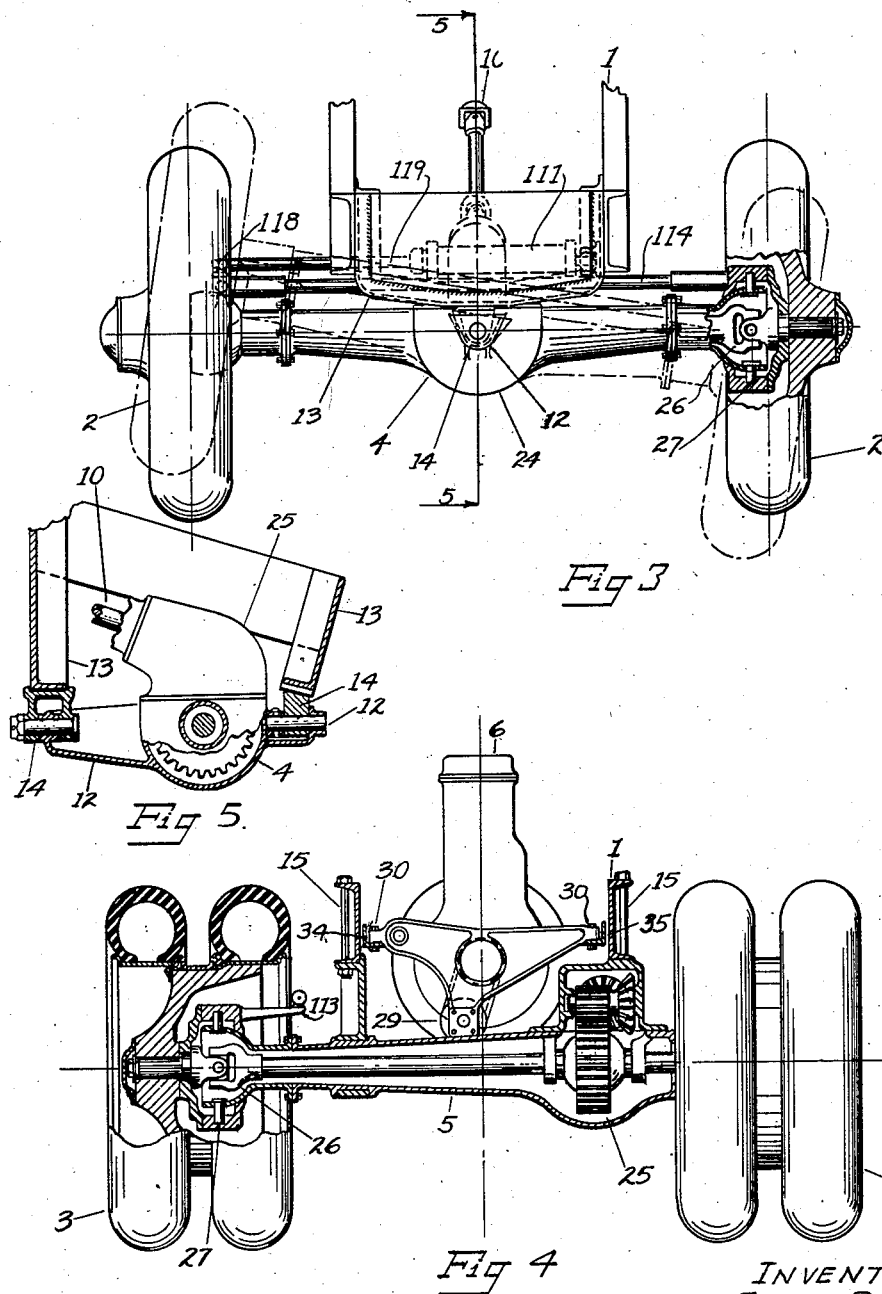
INVENTORS
FRED D. WILSON
LEONARD S. BURNS
BY J D Benbow

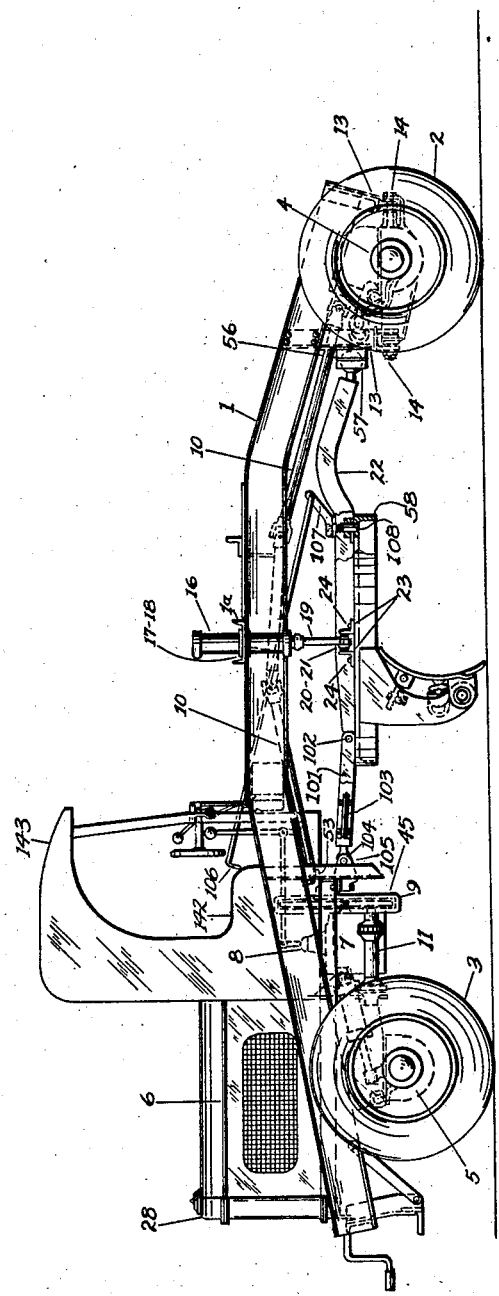

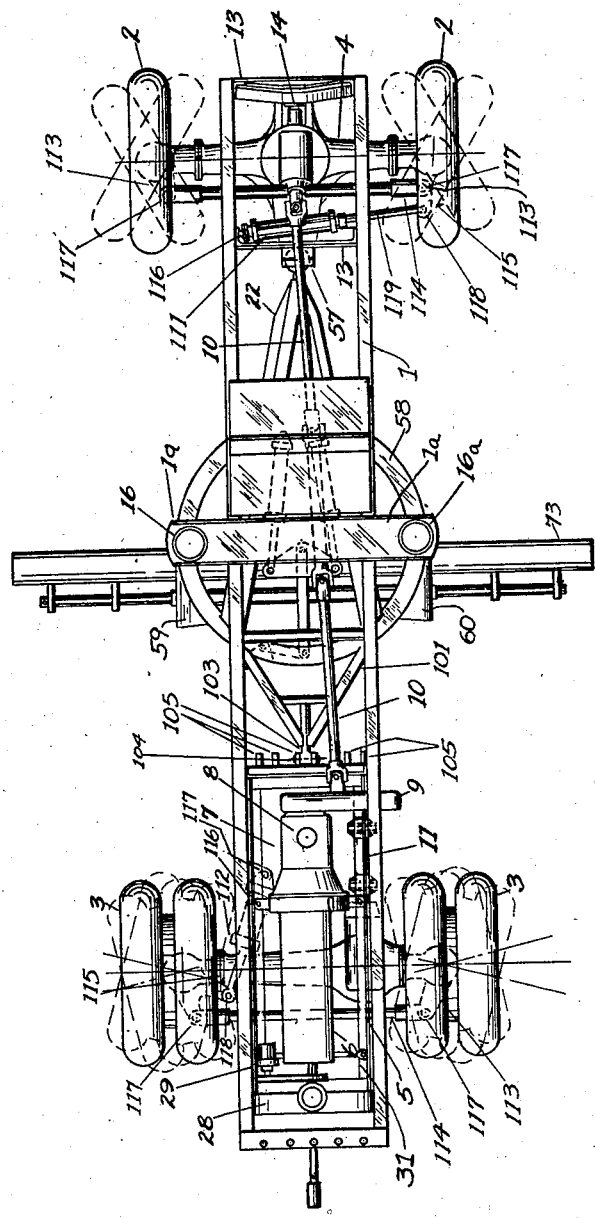

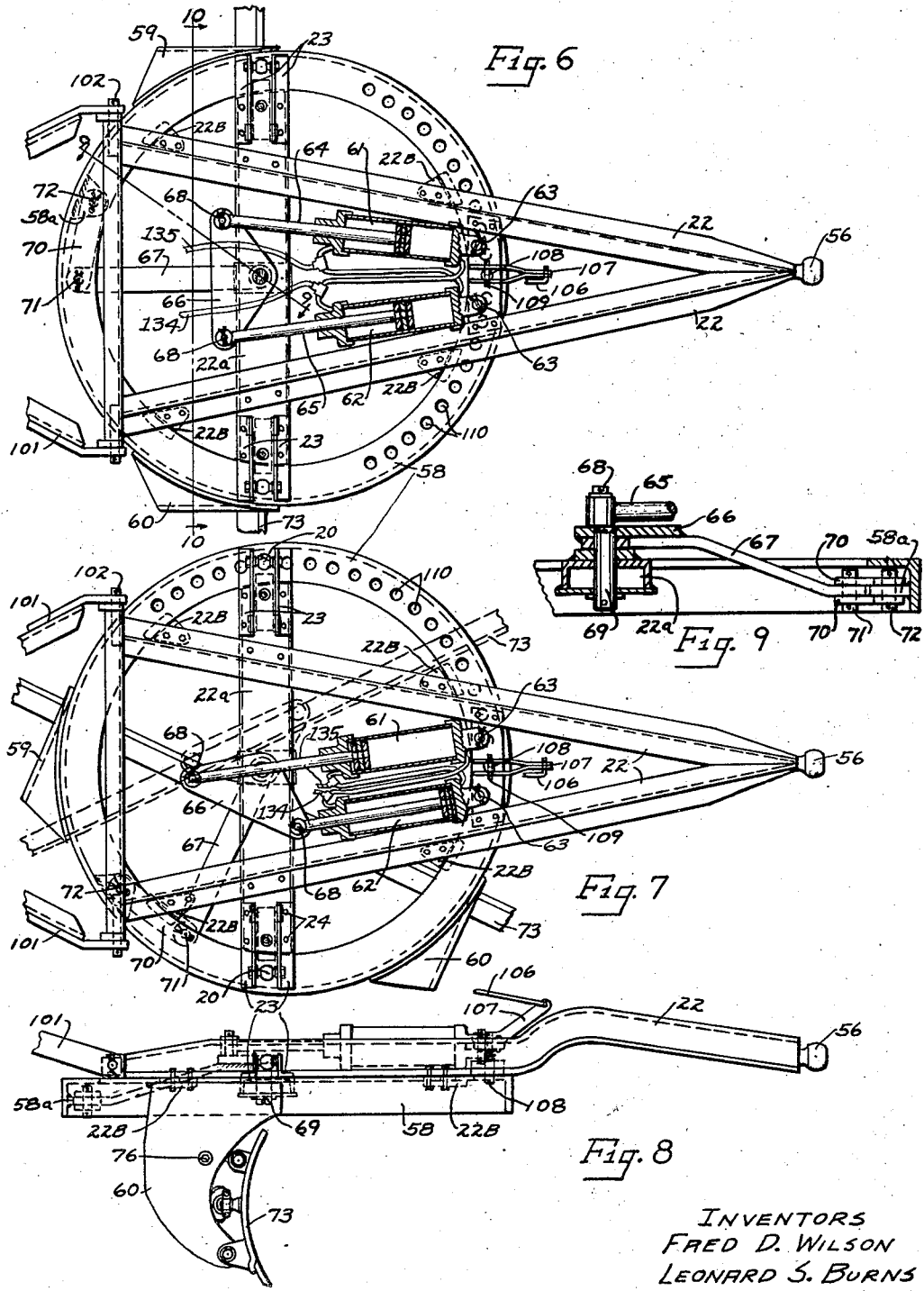

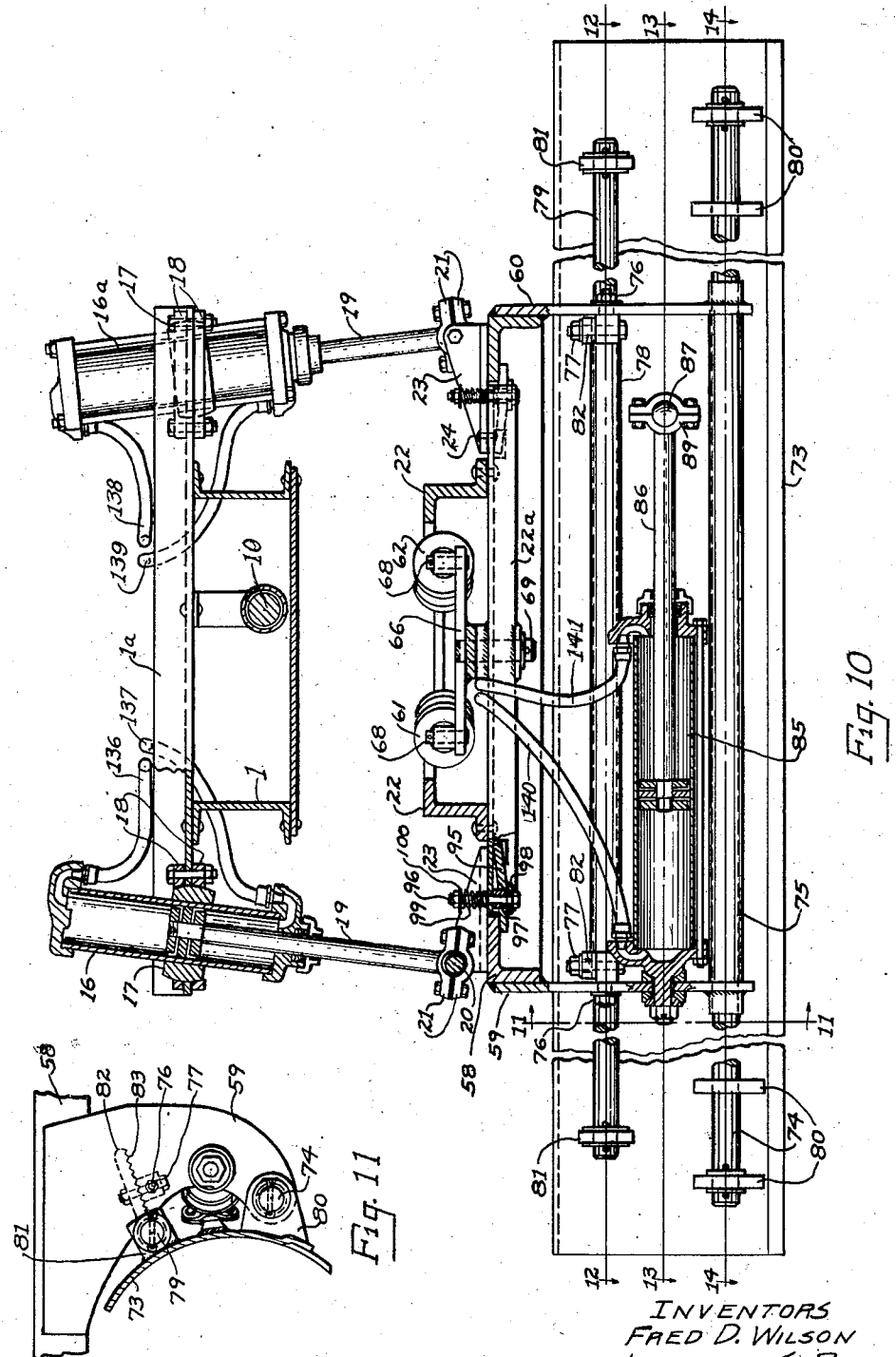

April 2, 1940.　　F. D. WILSON ET AL　　2,195,607
SELF-PROPELLED ROAD MACHINE
Filed Aug. 31, 1936　　12 Sheets-Sheet 6

INVENTORS
FRED D. WILSON
LEONARD S. BURNS
BY J. D. Benbow

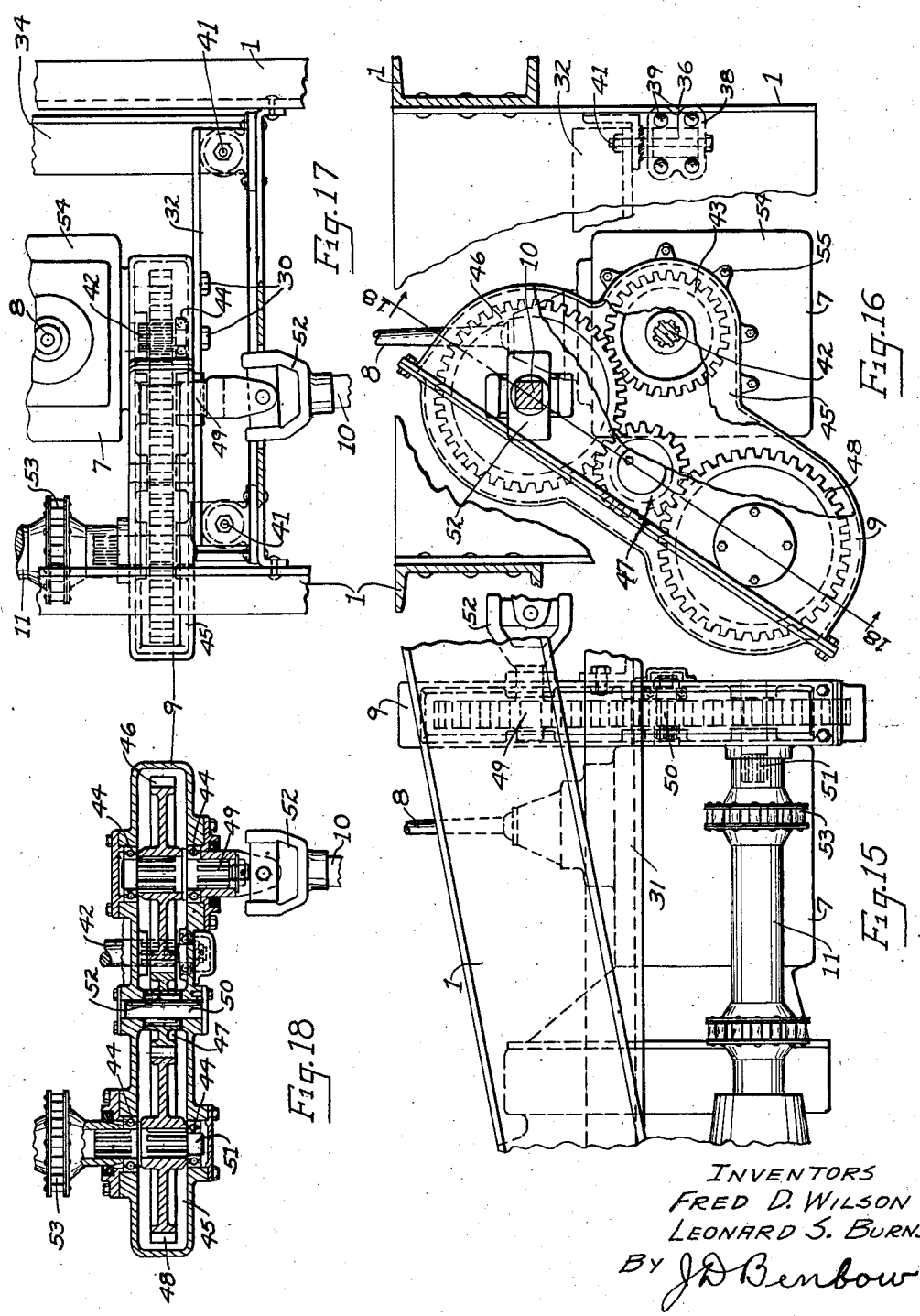

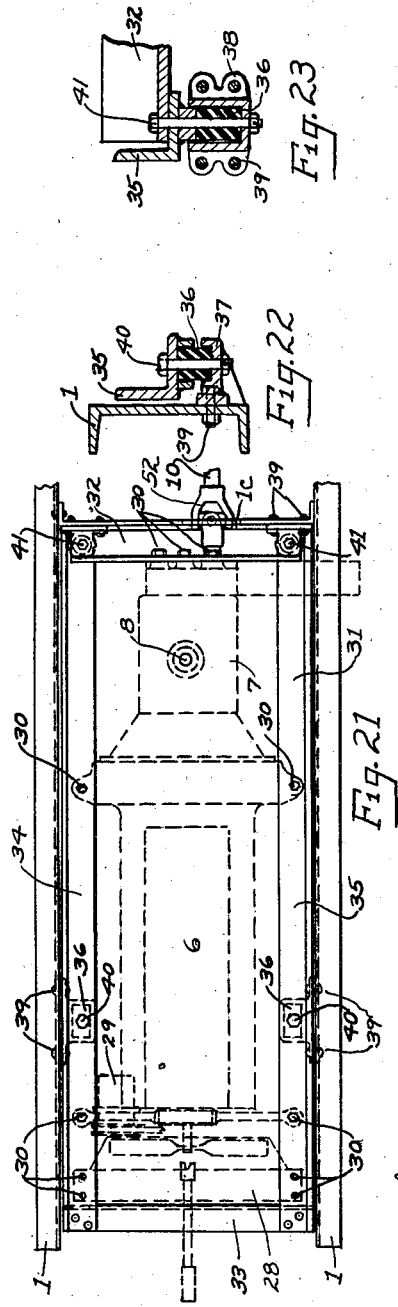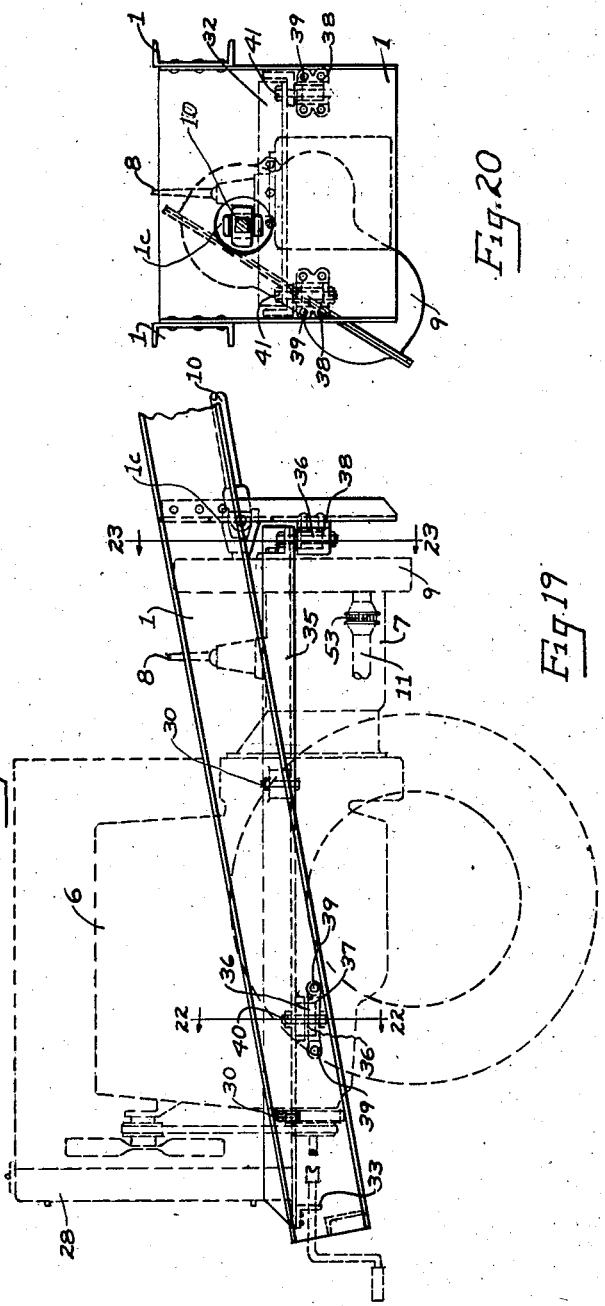

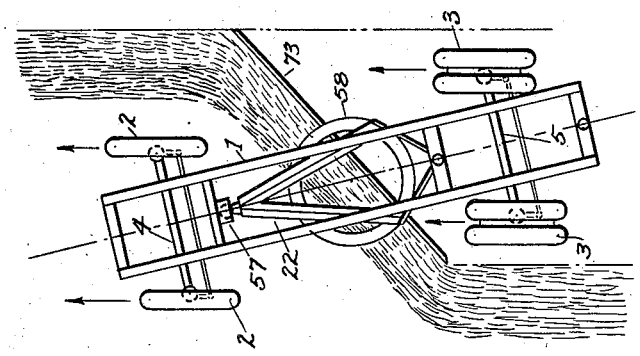
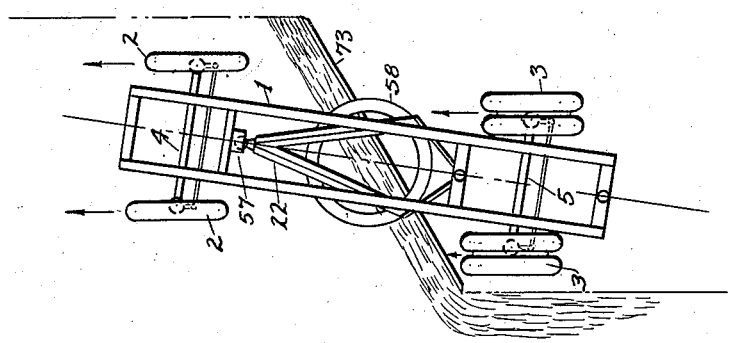
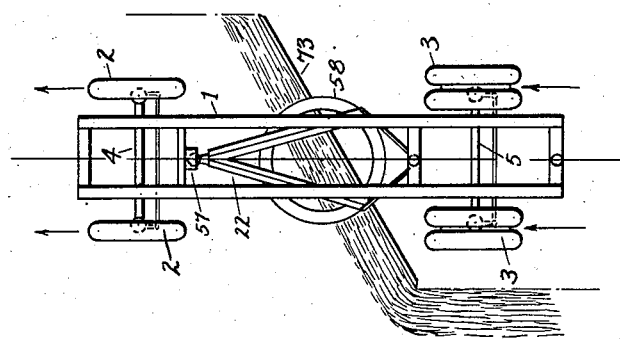

April 2, 1940.  F. D. WILSON ET AL  2,195,607
SELF-PROPELLED ROAD MACHINE
Filed Aug. 31, 1936   12 Sheets-Sheet 10
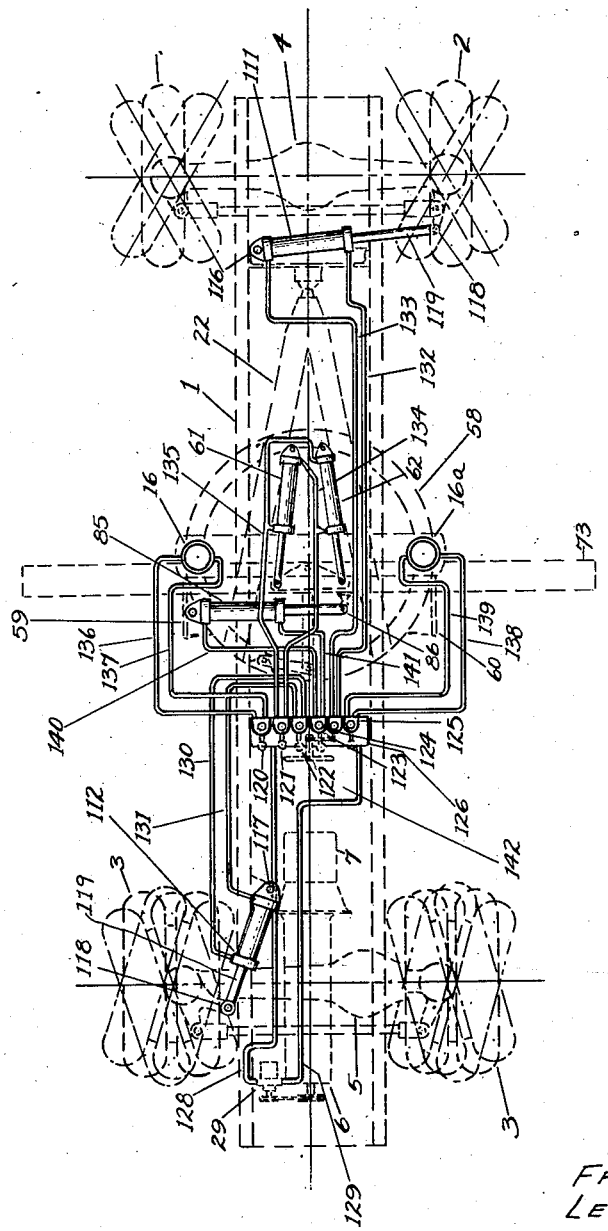
INVENTORS
FRED D. WILSON
LEONARD S. BURNS
BY J.D.Benbow April 2, 1940.   F. D. WILSON ET AL   2,195,607
SELF-PROPELLED ROAD MACHINE
Filed Aug. 31, 1936      12 Sheets-Sheet 11

INVENTORS
FRED D. WILSON
LEONARD S. BURNS
BY J. D. Benbow

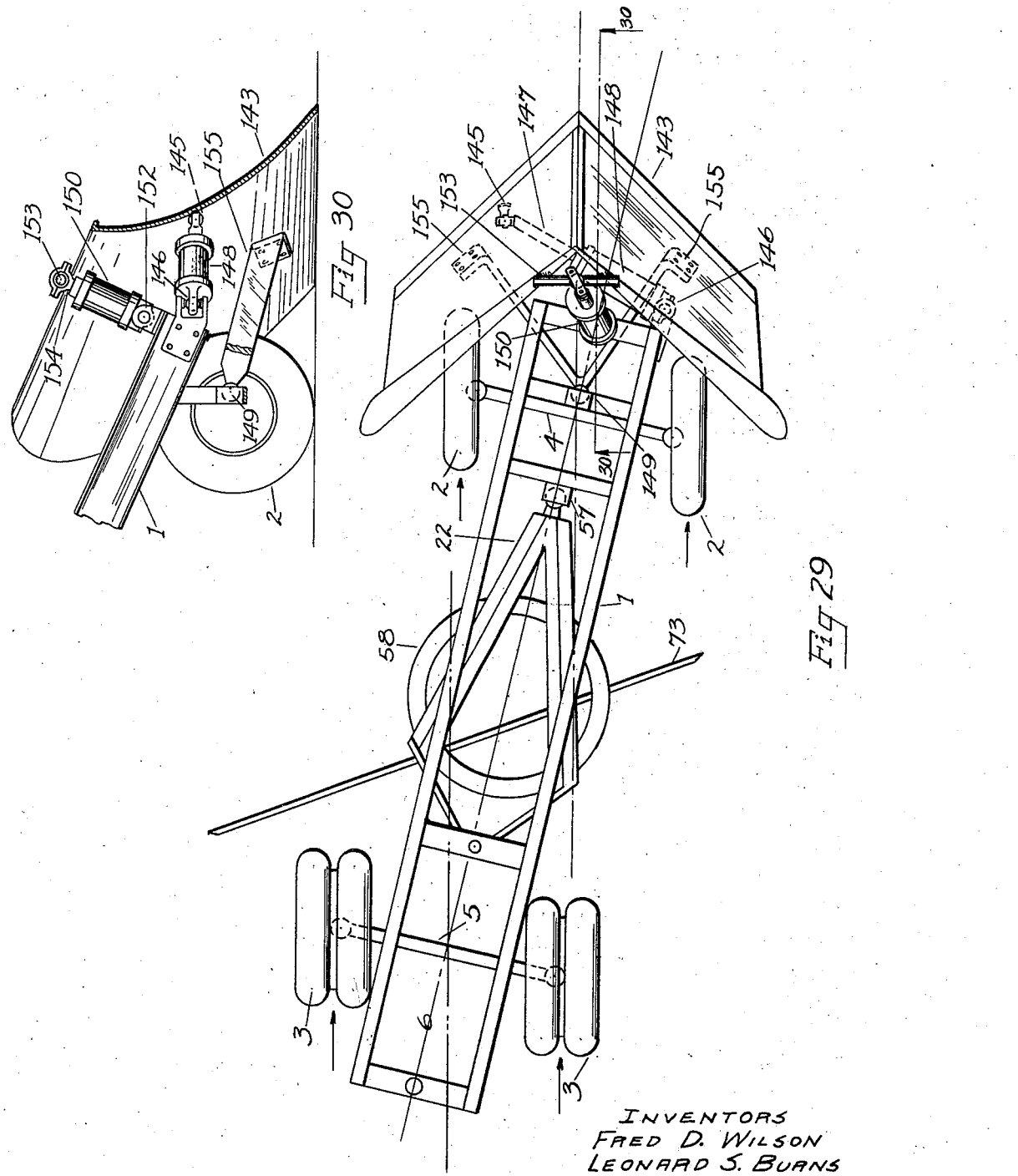

Patented Apr. 2, 1940

2,195,607

UNITED STATES PATENT OFFICE 2,195,607

SELF-PROPELLED ROAD MACHINE

Fred D. Wilson and Leonard S. Burns, Aurora, Ill., assignors to Western-Austin Company, Aurora, Ill., a corporation of Illinois Application August 31, 1936, Serial No. 98,704

21 Claims. (Cl. 37—156)

The present invention relates to improvements in self-propelled road machines or motor graders, especially to the method of applying the propelling forces to the earth moving or road working tool or tools when moving material on the road or ground. Motor graders or self-propelled road machines, have heretofore been provided with rear wheels self-propelled and the front wheels steerable, and with the rear wheels and front wheels self-propelled and the front wheels only steerable. This invention is a self-propelled road machine having all wheels steerable and power driven and adaptable for operation with various road working tools.

With this invention, the operator on the operator's station is able to control all the movements of the blade, especially the side shifting of the blade on its supporting means, without changing the angular relation of the blade to the road, and to independently steer the steerable front and rear power driven wheels in the same direction or in the opposite direction. Thus, when the machine is moving on a straight road and the blade encounters an obstruction, such as a tree or culvert, the blade can be quickly side shifted to avoid the obstruction and then shifted back to its original position, maintaining the same plane or level of the road without retarding the forward motion of the machine.

Also, in rounding curves we are able to steer the steerable front and rear power driven wheels in opposite directions and side shift the blade on its supporting means without changing its angular relation to the ground during the forward motion of the machine, which enables us to grade the road in the same plane and also follow the curve of the road, a result that has heretofore been impossible. This is also true on reverse curves.

On self-propelled road machines as herebefore built, the forces set up by the road working tools in moving material by blades when set at an angle to the direction of travel, cause a side twisting lateral action to the frame of the machine. One of the problems confronting the inventors of self-propelled machines has been the result of this side draft (or side forces) set up by the blade moving the material in a lateral direction when blade is set in a position diagonal with the line of travel. Specifically, when one of these machines is used for what is known as "oil mix" work, it is necessary for a substantial windrow of material to be transferred laterally of the roadway, as it is the turning over process that is relied upon to properly mix the material. When doing this work it is not only desirable but necessary that the position of the point, or front end of the blade, be well outside of both front wheels in order to avoid the necessity of propelling the front wheels, or wheel, through the loose material, which increases the draft and wear on the machine and also causes the blade to travel on an irregular horizontal plane. With the blade laterally adjusted to the necessary position outlined above, it will be obvious, due to the extended or overhanging position of the blade beyond one side of the rear propelling wheels, that the work being done (material being moved) at the point of the blade often tends to severely influence the course of the machine by creating a distinct side "twist" to the entire machine and causing tire wear and loss of tractive power.

One of the objects of this invention is to provide a self-propelled road machine adapted to offset the tendency of the above mentioned side forces to turn the machine from its course. We have accomplished this by providing the rear propelling wheels with means for steering them to either side of the path of the front wheels; we point out too that the front or steering wheels are also propelling wheels in our machine. By having both the front and rear wheels steerable and at the same time propelling wheels, it will be obvious that by adjusting the rear wheels to travel a path to either side of the path of the front wheels, we are enabled to increase the width of what we term the "traction base" or to have selective traction range to any reasonable desired extent. The "traction base" or selective traction range referred to is the width of the horizontal plane upon which the rear and front wheels travel; that is, the distance on the horizontal plane between the left rear wheel and the right front wheel, or vice versa, depending upon the adjustment of the front and rear wheels in relation to the main frame.

By having a machine provided with means for increasing the width of the "traction base" or what is known as selective traction range, it will be observed that we are enabled to always arrange a traction wheel, or wheels, directly, or almost directly, in line (longitudinally) with any point on the blade, which removes the objectionable overhanging of the blade beyond the "traction base" and therefore eliminates the tendency of the material to twist the machine from its course, as has been the case on self-propelled road machines as herebefore built. Therefore, it can be readily seen that it is very important to have a self-propelled road machine have selective traction range for increasing or decreasing the width of the "traction base" of the wheels to provide resistance against the side shifting of the machine during its forward movement. Selective traction range is new in the self-propelled motor grader field and is, beyond doubt, a forward step in a combination of elements which have produced new results.

Another object of this invention is to provide a machine that will cause the blade to travel on a regular horizontal plane instead of an irregular horizontal plane and reduce tire wear and loss of tractive power.

Another object of this invention is to provide a machine that will be particularly efficient in connection with snow removal, in which case the front propelling wheels may serve as a principal propelling and lateral means for a snow plow mounted to precede them; the blade being shifted horizontally and the "traction base" or selective traction range adjusted so that the rear propelling wheels are the principal propelling and laterally controlling forces for the heel of the blade, permitting the cutting of a much wider path than is possible with snow plows attached to conventional motor graders.

Another object of this invention is to provide a motor grader or self-propelled road machine with a pair of steerable and propelling wheels at the front and rear end of the machine, and steering means for steering the front and rear power driven wheels independently or in unison for the purpose of cutting sharp curved ditches and scraping curved banks, or to move material on reverse curved roads from the right side to the left side of the road machine or from the left side to the right side of the road machine on successive curves during the forward movement of the road machine.

Another object of this invention is to provide a self-propelled road machine with control means at the operator's station to enable the operator to steer the front and rear steerable power driven wheels and side shift the blade, consecutively or together, in grading the road on reverse curves, and to maintain the same grade or slope at all points of the road, and to apply the tractive effort of the power driven wheels where it is most needed.

Another object of this invention is the provision of a four-wheel drive, four-wheel steer motor grader having a power plant mounted above and to the rear of the rear propelling axle.

Still another object of this invention is the provision of resilient means supporting the power transmission unit in an auxiliary frame on the main frame, thus reducing vibration in frame and preventing frame twists from being transferred to the motor.

Another object of this invention is the novel means shown for making the diagonal adjustment of the rear wheels by power from the operator's station.

A further object of this invention is the provision of novel and practical means for lateral adjustment of the blade on its supporting arms by power at the will of the operator without his leaving the operator's station.

Another object of this invention is the provision of the lateral blade adjustment means whereby the cutting angle of the blade is not affected when said adjustment is made.

Another object of this invention is the provision of lateral blade adjustment whereby the operator can make the adjustment while the machine is in operation without changing the plane of the cutting bit.

A further object of this invention is the novel power transmission or power take-off means connecting the motor to both front and rear driving wheels whereby, if desired, a portion of the transmission means can be removed and the front driving wheels replaced with the conventional type of steering non-driving wheels.

Another object of this invention is the provision of steerable rear propelling wheels, with steering means of either manual or power control.

Another object of this invention is to provide means whereby the direction of the propelling forces to the earth moving or road working tool when moving material on the road or ground will always be parallel to the direction of travel which is true when the front and rear steerable power driven wheels are parallel to the center line of the frame of the machine, as well as when the center line of the frame is in diagonal relation to the direction of travel and the front and rear steerable power driven wheels are in the same angular relation with the center line of the frame.

Another object of this invention is to provide hydraulic power means to steer the front and rear steerable power driven wheels separately or together in the same direction or in the opposite direction.

Another object of this invention is to provide a road machine having all wheels self-propelled and steerable, adapted for operation with various road working tools, such as scarifiers, snow plows, drags, etc.

Another object of this invention is to provide a machine with greater capacity for moving material in a direction at right angles to the line of travel.

Another object of this invention is to provide a road machine whereby all the controls can be operated with mechanical power, hydraulic power, or manually, from the operator's station.

Further objects of this invention are to provide a construction of maximum simplicity, efficiency, economy and ease of assembly and operation, and such further objects, advantages and capabilities as will later more fully appear and are inherently possessed thereby.

The invention further resides in the combination, construction and arrangement of parts illustrated in the accompanying drawings and, while we have shown therein a preferred embodiment, it is to be understood that the same is susceptible of modification and change without departing from the spirit of our invention.

In the drawings:

Figure 1 is a side elevation of the motor grader or self-propelled road machine.

Figure 2 is a plan view of Figure 1 with cab removed.

Figure 3 is an enlarged front view of the motor grader showing front axle and wheels.

Figure 4 is an enlarged cross section of the rear power driven steerable wheels and supporting means.

Figure 5 is a partial cross section at 5—5 in Fig. 3 showing the method of supporting the front axle to the frame.

Figure 6 is a plan view of the gooseneck and circle with blade in horizontal position showing the hydraulic cylinder and the blade revolving means.

Figure 7 is a plan view of the gooseneck and circle with blade shown in two angular positions, and also the position of the hydraulic cylinders and pistons.

Figure 8 is a side elevation of Figure 6.

Figure 9 is a cross section of circle and gooseneck at 9—9 in Figure 6.

Figure 10 is an enlarged cross section of Figure 2 at 10—10 in Fig. 6 with one raising and lowering hydraulic cylinder cross section and the blade side shifting cylinder in cross section.

Figure 11 is an end view of Figure 10 at 11—11 showing blade supporting member 59.

Figure 15 is an enlarged portion of the power take-off or transmission shown in Figure 1.

Figure 16 is an end view of Figure 15.

Figure 17 is a partial plan view of Figures 15 and 16.

Figure 18 is a cross section of Figure 16 at 18—18.

Figure 19 is an enlarged fragmentary portion of the rear section of Figure 1 showing the mounting of the power plant and power take-off or transmission.

Figure 20 is an end view of Figure 19.

Figure 21 is a plan view of Figure 19.

Fig. 22 is a cross section of Figure 19 taken at 22—22 showing the power plant mounting means.

Figure 23 is a section of Figure 19 taken at 23—23 showing the power plant mounting means.

Figure 24 is an outline plan view of a motor grader showing relative positions of blade frame and wheels for maintenance.

Figure 25 is an outline plan view of a motor grader showing relative positions of blade frame and wheels when ditching.

Figure 26 is an outline plan view of a motor grader showing the relative positions of blade frame and wheels when grader is used for transferring a windrow of material from the side of the road towards the center of the road.

Figure 27 is a plan view showing the hydraulic power control, cylinders and connections thereto as applied to the motor grader.

Figure 29 is an outline plan view of the motor grader showing the application of the snow plow and blade when the longitudinal center line of the frame is at an angle to the direction of travel.

Figure 30 is a cross sectional view of the forward part of the snow plow and motor grader.

Figure 12:
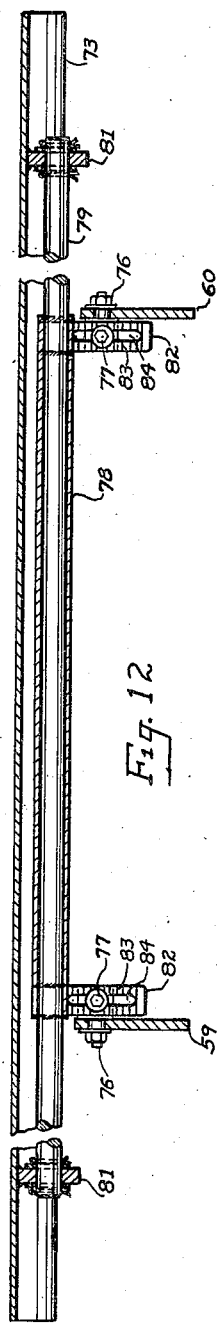
Figure 12 is a cross section of Figure 10 at 12—12.
Figure 13:
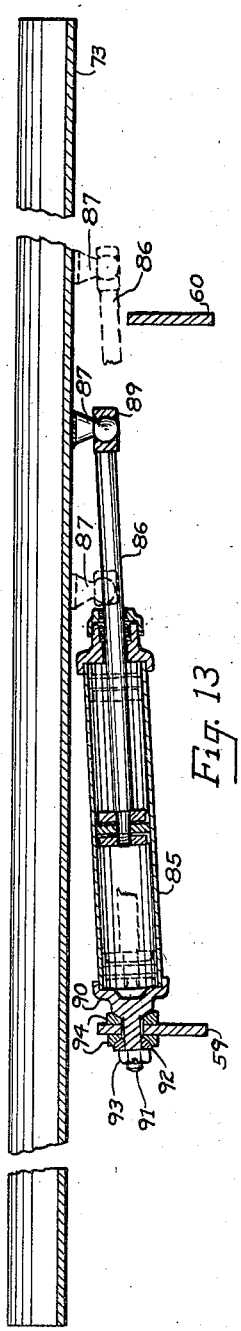
Figure 13 is a cross section of Figure 10 at 13—13.
Figure 14:
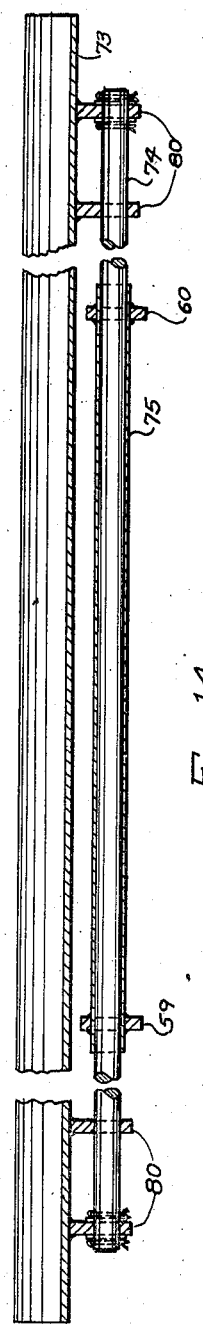
Figure 14 is a cross section of Figure 10 at 14—14.

Referring to the drawings, the road machine comprises a main frame which may be of any suitable construction and is designated 1 in its entirety, being supported on front power driven steerable wheels 2 and rear power driven steerable wheels 3. The front and rear power driven steerable wheels 2 and 3 are mounted on the conventional type steering and driving axles 4 and 5, having conventional type differential 25.

On the rear of main frame 1 is mounted an internal combustion engine or power plant 6 having a conventional type transmission 7 and gear shift 8. At the front of the conventional type transmission 7 is mounted power take-off or transmission 9, details of which are shown in Figures 15, 16, 17 and 18 and a more complete description will be given later.

Forwardly and rearwardly of the power take-off or transmission 9 are power transmission shafts 10 and 11, which are connected to and drive the front driving axle 4 and the rear driving axle 5, respectively. Transmission shafts 10 or 11 may be disconnected from power take-off or transmission 9, if it is desired to apply a conventional type non-driving axle in place of either of the power driven axles 4 and 5.

The front and rear power driven steerable wheels 2 and 3 are propelled through universal joints 26 and are vertically pivoted at 27 to permit steering.

At the center of the front and back of front driving axle 4, projections 12 are connected to main frame 1 by brackets 13 and pins 14. See Figures 3 and 5. This permits axle 4 to oscillate or adjust itself to the contour of the road or ground as shown in dotted lines. See Figure 3. Rear driving axle 5 is bolted to main frame 1 by bolts 15, as shown in Figure 4.

The internal combustion engine or power plant 6, including radiator 28, conventional transmission 7, power take-off or transmission 9 and hydraulic pump 29, is bolted by bolts 30 to a rectangular auxiliary supporting frame 31, consisting of front and rear angles 32 and 33 and side angles 34 and 35. The auxiliary supporting frame 31 and the above described power plant 6, radiator 28 and hydraulic pump 29 are suspended on rubber or any other resilient material 36 and mounted in brackets 37 and 38, which are fastened to main frame 1 by bolts or rivets 39. Bolts 40 and 41 fasten the auxiliary supporting frame 31 to brackets 37 and 38.

The preferred design of the power take-off or transmission 9 is shown in Figures 15, 16, 17 and 18 but other designs can be used which will be within the scope of the claims.

On the extension of the splined main shaft 42 of conventional transmission 7 is mounted gear 43, and the outer end of the main shaft 42 is supported in roller or ball bearings 44 mounted in gear case 45.

Gear 43 drives the train of gears 46, 47 and 48.

Gear 46 is mounted on a splined shaft 49 which extends forwardly and drives transmission shaft 10 through the universal joint 52, and shaft 49 is mounted on roller or ball bearings 44 in gear case 45.

Gear 48 is mounted on splined shaft 51, which extends rearwardly and drives transmission shaft 11 through universal joint 53, and splined shaft 51 is mounted on roller or ball bearings 44 in gear case 45.

Gear 47 is an idler and is used to reverse the direction of gear 48, and is mounted on roller or ball bearings 52 at stationary shaft 50 in gear case 45.

Gear case 45 is bolted to the conventional transmission housing or box 54 by bolts or stud screws 55.

By the above description it can readily be seen that either transmission shafts 10 or 11 can be readily detached from splined shafts 49 and 51, respectively.

Suspended on either side of the main frame 1 by cross channel 1a are hydraulic cylinders 16 and 16a mounted in ball and socket joints 17 and 18, respectively.

Piston rods 19 of hydraulic cylinders 16 and 16a are attached by ball and socket joints 20 and 21 to gooseneck or blade supporting frame 22 through cross beam 22a and angles 23, angles 23 being attached by rivets or bolts 24 to cross beam 22a.

The front end of gooseneck or blade supporting frame 22 has a ball joint 56 which is attached to the main frame 1 by socket 57.

Supporting and guiding circle 58 are brackets 22b, which are riveted or bolted to gooseneck or blade supporting frame 22.

Circle 58 is rotated by two double acting hydraulic cylinders 61 and 62. Each end of cylinders 61 and 62 is connected to gooseneck or blade supporting frame 22 by pins or bolts 63, and piston rods 64 and 65 are connected to the crank or lever 66 by pins or bolts 68. Welded to the crank or lever 66 is pin 69 which rotates in bearings of cross beam 22a. The crank or lever 66 has an extension 67 welded to crank or lever 66.

Extension 67 is connected to links 70 by pin or bolt 71 and links 70 are connected to the circle 58 by pins or bolts 72 through lug 58a, which is welded to the circle 58.

Attached to circle 58 by welding, riveting or bolting are blade supporting members 59 and 60. At the lower end of blade supporting members 59 and 60 is welded tube 75. The blade and bit 73 have lugs 80 through which rod 74 is attached and is supported and slides in tube 75.

The upper end of blade and bit 73 has lugs 81 to which rod 79 is attached, and rod 79 is supported and slides in tube 78. To each end of tube 78 is welded adjusting member 82 having corrugations 83 and slots 84.

Eye bolts 76 are fastened to blade supporting members 59 and 60 by nuts and lock washers. Adjusting member 82 is attached to eye bolt 76 by bolt 77.

For side shifting of blade and bit 73 on its blade supporting members 59 and 60, double acting hydraulic cylinder 85 is attached to blade supporting member 59 by cylinder head 90, which has a convex surface having projections 91 threaded for nut 93. The convex surface of cylinder head 90 contacts the concave surface of washer 94.

On the opposite side of the blade supporting member 59 is a similar washer 94, washer 92 having one surface convex and the other flat.

Nut 93 is attached to the projecting member 91 and tightened against the flat surface of washer 92. This allows the double acting hydraulic cylinder 85 to oscillate.

Piston rod 86 is connected to ball 87 by socket 89. Ball 87 is welded to the blade and bit 73.

Anti-chattering bar 95 is connected to the cross beam 22a by bolt and nut 96 which pass through washer 98, thimble 97, cross beam 22a, spring 99 and washer 100.

Thimble 97 limits the space between the cross beam 22a and anti-chattering bar 95. Adjustment is made by tightening or loosening nut or bolt 96.

At the rear end of gooseneck or blade supporting frame 22 is welded round members 102, to which is attached an A frame guide 101. The opposite end of A frame guide 101 is connected to main frame 1 at the lugs 105 by eye bolt 103 and bolt or pin 104. Lugs 105 are located at various positions on either side of the center of main frame 1. This construction permits the vertical movement and side adjustment of the A frame guide 101, and the combination of round member 102 and eye bolt 103 permits the gooseneck or blade supporting frame 22 to have a vertical movement and also a twisting movement.

Either mechanical, hydraulic or manual means may be used to cause side movement of A frame guide 101 and gooseneck or blade supporting frame 22.

A double acting hydraulic cylinder can be attached to main frame 1 and the piston rod can be attached to eye bolt 103 of A frame guide 101. Admitting oil to either side of the piston will cause A frame guide 101 and gooseneck or blade supporting frame 22 to shift in a sidewise direction, depending on which side of the piston the oil is admitted.

Circle 58 is locked in any position suitable for the working of the tool by any of the conventional methods, manual, mechanical or hydraulic. Manual means is shown in our drawings, consisting of the usual unlocking rod 106 connected to unlocking lever 107 which has a jaw for attaching lock pin 108 to lever 107 by bolt or pin 109.

Lock pin 108 engages one of the holes 110 in circle 58. A pull on unlocking rod 106 and a turn of 90 degrees on unlocking lever 107 lifts lock pin 108 out of engagement with circle 58. This permits its rotation.

A push on rod 106 will return lever 107 back to its original position and locking pin 108 will engage the circle in holes 110 and prevent rotation.

The steering of front and rear power driven steerable wheels 2 and 3 is accomplished by double acting hydraulic cylinders 111 and 112, respectively. Cylinders 111 and 112 are attached to main frame 1 at 116 and 117 by pins or ball and socket joints.

The power driven steerable wheels 2 and 3 have the usual steering levers 113 and drag links 114 connected by pins 117. One of the steering levers 113 of the front and rear power driven steerable wheels 2 and 3 has an extension 115 to which is attached piston rod 119 by pins 118, or a ball and socket joint may be used.

Figure 27 shows a schematic layout of the hydraulic control system. Oil tank 126 is mounted in the front of operator's station 142 and is connected to pump 29 by pipe lines 128 and 129. Power plant 6 supplies power to operate pump 29.

The control valves 120, 121, 122, 123, 124 and 125 are located on top of oil tank 126 at operator's station 142 and in front of the operator.

To steer the front power driven steerable wheels 2, valve 124 is moved forward or backward from the neutral position, admitting oil under pressure from pump 29 to either end of the piston of cylinder 111 through pipe lines 132 and 133, depending on the direction of the movement desired.

Likewise, the rear power driven steerable wheels 3 can be controlled by valve 122 and cylinder 112 through pipe lines 130 and 131. The steering of front and rear power driven steerable wheels 2 and 3 can be synchronized by hydraulic means and operated by one control valve, and the front and rear power driven steerable wheels 2 and 3 can be turned or steered in the same direction (see Figures 24, 25 and 26) or in the opposite direction (see Figure 28).

Further, the front or rear power driven steerable wheels 2 and 3 can be manually controlled or steered by the use of any one of the conventional steering devices, or we could use a combination of a hydraulic steering device for the front power driven steerable wheels 2 and a manually controlled steering device for the rear power driven steerable wheels 3.

The revolving of circle 58 with blade supporting members 59 and 60 and blade 73 is accomplished by two cylinders 61 and 62, having the front end of cylinder 61 connected by pipe or hose 135 to the rear of cylinder 62 and the front end of cylinder 62 connected by pipe or hose 134 to the rear of cylinder 61, said cylinders 61 and 62 being controlled or operated by the operator at operator's station 142 by moving the valve handle of valve 121 forward or backward, depending on the direction of rotation required.

The side shifting of blade 73 on the supporting members 59 and 60 is controlled by valve 123, which admits oil by pipe or hose lines 140 and 141 to either side of the piston of cylinder 85 by moving the handle of valve 123 forward or backward, depending on the direction that blade 73 is to be shifted.

The raising and lowering of gooseneck or blade supporting frame 22, circle 58 and blade 73 is accomplished by hydraulic cylinders 16 and 16a. Cylinder bodies 16 and 16a are supported by ball and socket joints 17 and 18 on cross channel 1a, and piston rods 19 are connected to cross beam 22a of gooseneck or blade supporting frame 22 by ball and socket joints 20 and 21.

Control valve 120 admits oil to the upper or lower side of the piston of cylinder 16 through pipe or hose lines 136 and 137 and the moving of valve 120 either forward or backward will raise or lower the left hand side of the blade and its supporting means, thereby controlling the vertical position of blade 73.

Likewise, cylinder 16a is controlled by valve 125, which admits oil to either side of the piston of cylinder 16a through pipe or hose 138 and 139.

Both right and left sides of blade 73 can be raised together, or one side can be lowered and the other raised, or vice versa, all being under the control of the operator located at operator's station 142.

All the hydraulic control means or valves are located within easy reach of and in front of the operator at operator's station 142, and the operator has full control of all the necessary movements of the blade and its supporting means, and the steering of the front and rear power driven steerable wheels, thus eliminating the necessity of the operator stopping the machine or grader and leaving the station to perform any of the above mentioned movements.

Figure 24 shows the position of the power driven steerable wheels 2 and 3, frame 1 and blade 73 when performing the ordinary maintaining of a road, and the direction of the force exerted by front and rear power driven steerable wheels 2 and 3 is parallel to the direction of travel of the grader.

Figure 25 shows the position of power driven steerable wheels 2 and 3 when ditching and bringing material up from said ditch and distributing it on the center of the road. Since all wheels 2 and 3 are power driven and steerable, the force exerted by power driven steerable wheels 2 and 3 is also parallel to the direction of travel, right front wheel 2 and the left rear wheel 3 are opposite their respective ends of blade 73, and frame 1 is at an angle to the direction of travel.

Figure 26 shows the position of front and rear power driven steerable wheels 2 and 3, blade 73, and main frame 1 when the power propelled road grader, with all wheels steerable and power propelled, is being used in moving windrows of any kind of material, such as oil mix or gravel, from the right hand side of the road to the center of the road and power driven steerable wheels 2 and 3 are all set at an angle to the longitudinal center line of the frame so that right front wheel 2 does not run in the windrow of material being handled and left rear wheel 3 also clears the new windrow of material being deposited near the center of the road. The longitudinal center line of the grader frame is at an angle to the direction of travel and the force exerted by the wheels to move the material is in a direction parallel to the direction of travel. In the above, the blade 73 has been shifted to the right on its supporting members 59 and 60, thereby putting a greater portion of blade 73 on the right side.

Due to the combination of a power driven road grader, all wheels being power driven and steerable, we have produced a new result whereby the tractive force exerted by the power driven steerable wheels is always parallel to the direction of travel of the machine when the front and rear wheels are parallel to the center line of the frame or when the front and rear wheels are set at the same angular relation to the center line of the frame, which fact is very self-evident if reference is made to Figures 24, 25 and 26. These figures illustrate the method of increasing or decreasing the width of the "traction base", which is known as selective traction range. By the use of selective traction range, side slippage of the wheels when moving material is eliminated.

Figure 28:
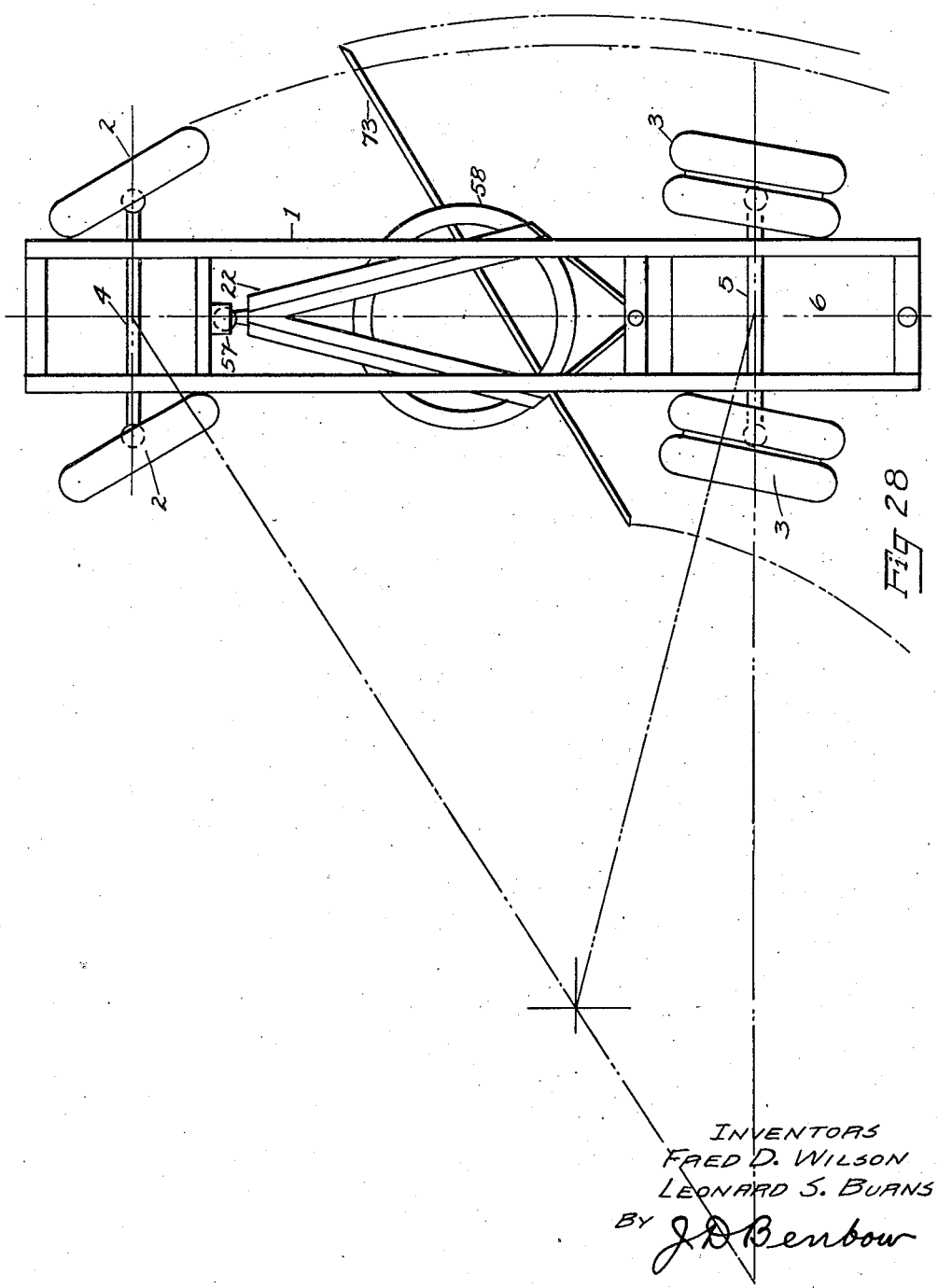
Figure 28 is an outline plan view of the motor grader showing the position of the wheels and frame when cutting ditches on a curve.

Figure 28 shows what can be accomplished by the application of this new motor grader, with all wheels power driven and steerable, to moving material on curves. The wheels travel in a curved line and prevent side slipping.

Figures 29 and 30 show the application of a snow plow 143 to the power propelled steerable wheeled grader. Snow plow 143 is attached to the front end of a downward projection of main frame 1, or any other suitable means, by a V-shape member having a ball and socket 149. The opposite ends of the V-shape member are attached to snow plow 143 by rivets or bolts at 155. Ball and socket joint 149 permits the snow plow 143 to have vertical movement as well as horizontal movement.

Cylinder 148 is mounted on main frame 1 by ball and socket joint 146 and piston rod 147 is connected to snow plow 143 by ball and socket 145. Cylinder 148 will move snow plow 143 in a sidewise direction. Cylinder 150 is mounted on main frame 1 by ball and socket 152, and piston rod 154 is connected to the upper end of snow plow 143 by ball and socket 153, the ends of ball and socket 153 being welded, or secured by any other means, to snow plow 143.

The raising and lowering of snow plow 143 is accomplished by admitting oil to either side of the piston of cylinder 150 and the direction of movement is controlled by hydraulic valve means located at operator's station 142.

Snow plow 143 is moved radially by the application of oil to either side of the piston of cylinder 148 and the direction is controlled by the hydraulic valve means located at operator's station 142.

Plan view Figure 29 shows that the direction of the force exerted by the power driven steerable wheels 2 and 3 is parallel to the direction of travel, although the longitudinal center line of main frame 1 is at an angle to the direction of travel. By the power being exerted parallel to the direction of travel, sidewise shifting is prevented.

By the use of the combination shown in Figure 29, the blade and bit 73 has been shifted to the left of the center line of circle 58 and thus the snow moved by snow plow 143 will be moved still farther laterally by the blade and bit 73. It is also possible to reverse the direction of the snow by steering power driven steerable wheels 2 and 3 in the opposite direction and reversing the side shift of the blade and bit 73.

A straight blade snow plow may be substituted for V-shape snow plow 143 and the control will be similar.

From the description of the invention, it is readily seen that other combinations may be made without departing from the spirit of the invention.

We claim:

1. In combination with a road grading machine, comprising a frame, front and rear power driven axles on which the frame is mounted, front and rear steerable power driven wheels mounted on said axles, a blade with hydraulic means to raise, lower, rotate and side shift the blade supported from said frame, hydraulic cylinders connected to the frame with piston rods fastened to the steering members of the front and rear wheels, a power plant with hydraulic pump mounted on said frame, an auxiliary power take-off or transmission mounted on said power plant, transmission shafts connected forwardly and rearwardly to the auxiliary power take-off or transmission, the opposite ends of said transmission shafts being connected to the front and rear power driven axles to transmit power to the front and rear steerable power driven wheels, an operator's station on said machine, hydraulic control means at the operator's station to independently control the said front and rear wheels and to steer the said front and rear wheels in the same direction or in the opposite direction to control the traction base of the said wheels.

2. In a self-propelled road grading machine, in combination, an elongated frame, a road working blade supported by the said frame and adapted for rotative, vertical and horizontal adjustment, a set of independently steerable power driven wheels supporting each end of the said frame, an operator's station on the machine, steering mechanism at the operator's station to steer each set of wheels independently or together in the same direction or in the opposite direction.

3. In combination with a self-propelled road grader, a main frame supported at the front and rear by independently steerable pairs of power driven wheels, a power plant mounted on the said main frame and connection made therefrom to the front and rear axles for driving the front and rear steerable power driven wheels, an auxiliary frame or gooseneck with means for raising, lowering and side shifting said auxiliary frame or gooseneck attached to said main frame, a circle, blade supporting members and blade and means for rotating the circle and blade supporting members and blade relative to the said auxiliary frame or gooseneck and supported by said auxiliary frame, side shifting means attached to the said blade supporting members and blade, an operator's station mounted on said main frame, control means at the operator's station for selectively and independently controlling the movement of the blade, auxiliary frame or gooseneck and to independently steer each pair of steerable power driven wheels in the same direction or in the opposite direction while the grader is in motion.

4. In a road machine, in combination, an elongated frame supported at each end by steerable driving wheels, a motor carried by the frame and suitably connected to drive the said wheels, a road working blade with means for raising, lowering, rotating and side shifting the blade mounted between the ends of the frame, an auxiliary blade with means for raising, lowering, rotating and side shifting the auxiliary blade, supported by the front end of the frame, an operator's station mounted on said frame, independent means at the operator's station to simultaneously or independently control the movements of the blade and the auxiliary blade and to control the said wheels and to steer the said front and rear wheels in the same direction or in the opposite direction.

5. In a self-propelled road grading machine, in combination, an elongated frame, a road working blade with hydraulic means for rotative, vertical and horizontal adjustment supported by the frame, a set of steerable power driven wheels with hydraulic steering means connecting said steerable power driven wheels and frame supporting each end of the frame, an operator's station with independent hydraulic control means mounted on said frame, said independent hydraulic control means operable from the operator's station for controlling the adjustment of the road working blade and steering each set of steerable power driven wheels independently or together to control the width of the traction base.

6. In combination with a self-propelled road machine, having a frame, front and rear independently steerable pairs of power driven wheels supporting said frame, a blade supported by said frame with means for raising, lowering, rotating and side shifting the blade, an operator's station on the machine, control means at the operator's station to control each pair of wheels independently and to steer the pairs of wheels in the same direction or in the opposite direction.

7. In combination with a self-propelled road machine, having a frame, front and rear independently steerable pairs of power driven wheels supporting said frame, a blade with means for raising, lowering, rotating and side shifting said blade supported by said frame, an operator's station mounted on said frame, independent control means at the operator's station to control all the positions of the blade and the steering of the said front and rear wheels, to move material on reverse curved roads from the right side to the left side of the road machine or the reverse, on successive curves during the forward movement of the road machine.

8. In combination with a self-propelled road machine, having a frame, a pair of front and rear steerable power driven wheels supporting said frame, a blade with means for raising, lowering, rotating and side shifting said blade supported by said frame, an operator's station mounted on said frame with independent control means to control the position of the said front and rear pairs of wheels, applying the tractive effort of the said pairs of wheels in the direction of travel of the machine preventing the side slipping of said road machine while the center line of the frame is at an angle to the direction of travel.

9. In a self-propelled road machine, in combination, having an elongated frame, front and rear steerable pairs of power driven wheels supporting said frame, a road working blade with means for raising, lowering, rotating and side shifting the blade supported by the frame, an operator's station on the machine, power control means at the operator's station to raise, lower, rotate and side shift the blade and to control the width of the traction base of the front and rear pairs of steerable power driven wheels while the grader is in motion.

10. A self-propelled grader, in combination, a frame, front and rear independently steerable sets of power driven wheels supporting said frame, a blade with means for raising, lowering, rotating and side shifting the blade supported by said frame, an auxiliary blade with means for raising, lowering, rotating and side shifting the auxiliary blade supported by said frame ahead of the said front wheels, a power plant with means connected thereto to propel the front and rear steerable power driven wheels mounted on the rear of the frame, an operator's station mounted on the frame in front of the power plant and in the rear of the blade, control means at the operator's station to control each set of wheels independently and to steer the front and rear sets of wheels in the same direction or in the opposite direction to select the width of the traction base of said wheels.

11. In combination with a self-propelled road machine, having a frame, front and rear steerable power driven wheels with hydraulic steering means supporting said frame, a blade with hydraulic means for raising, lowering, rotating and side shifting the blade supported by said frame, a power plant and hydraulic pump mounted on said frame in back of said blade, an operator's station mounted on said frame between the power plant and said blade with independent hydraulic control means to control the positions of the blade and to independently steer the front and rear steerable power driven wheels in the same direction or in the opposite direction for selective traction range.

12. A self-propelled road machine, in combination, a frame, two independently controlled steerable power driven wheel units supporting said frame at the front and rear, a power plant mounted on the machine with propelling means connected to the said front and rear wheel units to propel the same, a blade with means for raising, lowering, rotating and side shifting said blade mounted on the frame between said wheel units, an operator's station on the machine, independent control means at said operator's station to independently control the positions of the blade and to steer the front and rear steerable power driven wheel units in the same direction or in the opposite direction.

13. A self-propelled road grader, in combination, having two independently controlled steerable power driven wheel units, a frame connecting and supported by said wheel units, a blade with means for raising, lowering, rotating and side shifting the blade mounted on said frame between said wheel units, an operator's station mounted on said frame between said wheel units and at the rear of the blade, means at said operator's station to steer the wheels of said units to widen the traction base and apply power behind the forward end of the blade and in front of the rear end of the blade or reverse when said blade and the center line of said frame are at an angle to the direction of travel.

14. In a self-propelled road machine, in combination, a frame, front and rear independently steerable power driven wheels supporting said frame, a blade with power means to raise, lower, rotate and side shift the blade supported by said frame, an operator's station on said machine, power control means at the operator's station to independently steer the said front wheels or rear wheels, or all said wheels simultaneously, in the same direction or in the opposite direction.

15. In a self-propelled road machine, in combination, a frame, front and rear independently steerable power driven wheels supporting said frame, a blade with means for raising, lowering, rotating and side shifting the blade supported by said frame, an operator's station on the machine, control means at the operator's station to steer the said front and rear steerable power driven wheels in the same direction and in the same angular relation to the center line of the frame and to control the width of the traction base of said wheels, and to apply the tractive effort of said wheels parallel to the direction of travel.

16. In combination with a self-propelled road machine, having a frame, front independently steerable pairs of wheels and rear independently steerable pairs of power driven wheels supporting said frame, a blade supported by said frame with means for raising, lowering, rotating and side shifting the blade, an operator's station on the machine, control means at the operator's station to control each pair of wheels independently and to steer the pairs of wheels in the same direction or in the opposite direction.

17. In combination with a self-propelled machine, having a frame, front and rear independently steerable pairs of power driven wheels with power steering means supporting said frame, an earth working tool supported by said frame with power means for raising, lowering, rotating and side shifting said earth working tool, an operator's station on the machine, power control means at the operator's station to control the raising, lowering, rotating and side shifting of said earth working tool and each pair of wheels independently and to steer the pairs of wheels in the same direction or in the opposite direction.

18. In combination with a self-propelled machine, having a frame, front and rear independently steerable pairs of power driven wheels with power steering means supporting said frame, an earth working tool supported by said frame with power means for raising, lowering, rotating and side shifting said earth working tool, an auxiliary earth working tool supported by said frame ahead of the said front wheels with means for raising, lowering, rotating and side shifting the auxiliary earth working tool, an operator's station on the machine, power control means at the operator's station to control all the movements of the said earth working tools and each pair of wheels independently and to steer the pairs of wheels in the same direction or in the opposite direction.

19. A self-propelled grader, in combination, a main frame, front and rear independently steerable sets of power driven wheels supporting said main frame, a blade with means for raising, lowering, rotating and side shifting the blade supported by said frame, a V-shaped blade with means for raising, lowering, rotating and side shifting the V-shaped blade supported by said frame ahead of the said front wheels, a power plant with means connected thereto to propel the front and rear steerable power driven wheels mounted on the rear of the frame, an operator's station mounted on the frame in front of the power plant and in the rear of the blade, control means at the operator's station to control all the movements of the blade and the V-shaped blade and each set of wheels independently and to steer the front and rear sets of wheels in the same direction or in the opposite direction to select the width of the traction base of the said wheels.

20. A self propelled road machine, in combination, a main frame, oscillating front and fixed rear power driven axles supporting said main frame, steerable pairs of power driven wheels with power steering means mounted on said axles, a blade supported by said frame with power means for raising, lowering, rotating and side shifting the blade, an operator's station on the machine, power control means at the operator's station to control all the movements of the blade and each pair of the said wheels independently and to steer the pairs of wheels in the same direction or in the opposite direction.

21. A self propelled road machine, in combination, an elongated main frame, front and rear steerable power driven wheels supporting said main frame, an auxiliary supporting frame with resilient means under said auxiliary frame mounted on said main frame, a power plant mounted on said auxiliary frame and suitably connected to drive the said wheels, a road working tool supported by said main frame with means for raising, lowering, rotating and side shifting the road working tool, an operator's station on said machine, control means at the operator's station to control all movements of said road working tool and control the steering of front and rear wheels independently or all said wheels simultaneously, in same direction or in the opposite direction to select the width of the traction base of said wheels.

FRED D. WILSON.
LEONARD S. BURNS.